United States Patent
Chen et al.

(10) Patent No.: US 12,524,827 B2
(45) Date of Patent: Jan. 13, 2026

(54) METHOD AND APPARATUS FOR OPERATING IMAGE DATA

(71) Applicant: Tencent Technology (Shenzhen) Company Limited, Guangdong (CN)

(72) Inventors: Zhonghua Chen, Guangdong (CN); Feng Li, Guangdong (CN); Chenghao Liu, Guangdong (CN); Yi Liu, Guangdong (CN); Tong Ai, Guangdong (CN); Haoyuan Li, Guangdong (CN); Qifeng Chen, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 494 days.

(21) Appl. No.: 17/976,185

(22) Filed: Oct. 28, 2022

(65) Prior Publication Data
US 2023/0049471 A1     Feb. 16, 2023

Related U.S. Application Data

(63) Continuation of application No. PCT/CN2022/082811, filed on Mar. 24, 2022.

(30) Foreign Application Priority Data

Mar. 31, 2021   (CN) .................. 202110349762.2

(51) Int. Cl.
    *G06T 1/60*    (2006.01)
    *G06F 17/16*   (2006.01)
    *G06T 1/20*    (2006.01)

(52) U.S. Cl.
    CPC .............. *G06T 1/60* (2013.01); *G06F 17/16* (2013.01); *G06T 1/20* (2013.01)

(58) Field of Classification Search
    CPC .. G06T 1/60; G06T 1/20; G06F 17/16; Y02D 10/00
    See application file for complete search history.

(56) References Cited

FOREIGN PATENT DOCUMENTS

| CN | 103368890 | 10/2013 |
| CN | 110246078 | 9/2019 |

(Continued)

OTHER PUBLICATIONS

Henshaw, G. "3 Ways to Understand Matrix Multiplication." Medium. Sep. 27, 2019. (Year: 2019).*

(Continued)

*Primary Examiner* — Vincent Rudolph
*Assistant Examiner* — Keely Gwynne Yeargin
(74) *Attorney, Agent, or Firm* — Crowell & Moring LLP

(57) ABSTRACT

The disclosure relates to method and apparatus for operating image data. The method includes: reading matrix data from the image data based on a matrix size, M rows and N columns, of an image operator (220); calculating column data in the matrix data with a single calculation instruction corresponding to the image operator, to obtain an intermediate calculation result (240); multiplexing and rearranging the intermediate calculation result into N rows of cached data (260); calculating matrix elements of a target column in the N rows of cached data with the single calculation instruction, to obtain a calculation result of the matrix data under the single calculation instruction (280); and outputting the calculation result as an image processing result of the matrix data by the image operator (300).

17 Claims, 10 Drawing Sheets

(56) References Cited

FOREIGN PATENT DOCUMENTS

| CN | 110263909 | | 9/2019 | | |
|----|-----------|---|--------|---|---|
| CN | 111582467 | | 8/2020 | | |
| CN | 111582467 A | * | 8/2020 | ............ | G06N 3/063 |
| CN | 112991142 | | 6/2021 | | |
| JP | 2000-175043 | | 6/2000 | | |
| WO | WO-2019184619 A1 | * | 10/2019 | ............... | G06F 1/08 |

OTHER PUBLICATIONS

International Search Report issued Jun. 8, 2022 in International (PCT) Application No. PCT/CN2022/082811.

* cited by examiner

| a0 | a1 | a2 |
|----|----|----|
| b0 | b1 | b2 |
| c0 | c1 | c2 |
FIG. 1
| k00 | k01 | k02 |
|-----|-----|-----|
| k10 | k11 | k12 |
| k20 | k21 | k22 |
FIG. 2
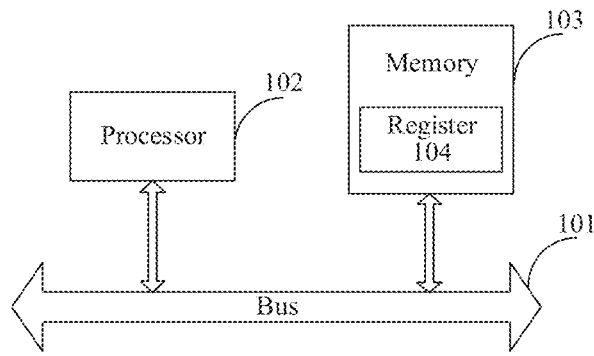
FIG. 3
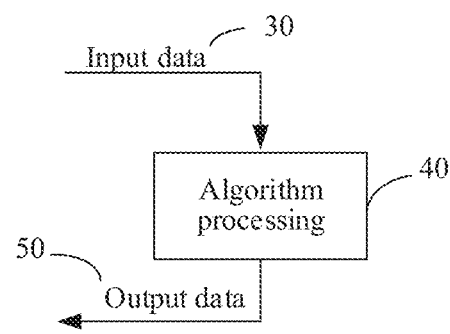
FIG. 4

FIG. 12

| t0 | s0 | s1 | s2 | s3 | s4 | s5 | s6 | s7 | s8 | s9 | sa | sb | sc | sd | se | sf |
|---|---|---|---|---|---|---|---|---|---|---|---|---|---|---|---|---|
| t1 | sf | s0 | s1 | s2 | s3 | s4 | s5 | s6 | s7 | s8 | s9 | sa | sb | sc | sd | se |
| t2 | s1 | s2 | s3 | s4 | s5 | s6 | s7 | s8 | s9 | sa | sb | sc | sd | se | sf | s0 |
|  | ↓ | ↓ | ↓ |  |  |  |  |  |  |  |  |  |  |  |  |  |
| Result | R0 | R1 | R2 | R3 | R4 | R5 | R6 | R7 | R8 | R9 | Ra | Rb | Rc | Rd | Re | Rf |

| Data type | Operator size | Resolution | Sliding_cost | OpenCV_cost | Speedup ratio |
|---|---|---|---|---|---|
| Uint8_t | 3×3 | 320×240×1 | 11718 | 22462 | 1.91 |
| | | 320×240×3 | 38420 | 69708 | 1.81 |
| | | 640×480×1 | 44336 | 82243 | 1.82 |
| | | 640×480×3 | 12986 | 26460 | 2.03 |

METHOD AND APPARATUS FOR OPERATING IMAGE DATA

RELATED APPLICATION

This application is a continuation application of PCT Patent Application No. PCT/CN2022/082811, filed on Mar. 24, 2022, which claims priority to Chinese Patent Application No. 202110349762.2, entitled "MATRIX OPERATION METHOD AND APPARATUS FOR IMAGE DATA, DEVICE, AND STORAGE MEDIUM", filed on Mar. 31, 2021, wherein the content of each of the above-referenced applications is incorporated herein by reference in its entirety.

FIELD OF THE TECHNOLOGY

This disclosure relates to the field of computer technologies, and in particular, to a method and apparatus for operating image data, a device, and a storage medium.

BACKGROUND OF THE DISCLOSURE

In a scenario of using neurons in a neural network to calculate image data, since the neurons are all operators in matrix form, a computer needs to store and calculate the image data in matrix form. Since a matrix operation process is generally computationally intensive and has a serious delay, the matrix operation needs to be optimized to improve the operation efficiency.

In the related art, an optimization method for matrix data rearrangement is provided, in which a rearrangement is performed on source matrix data, for example, the data is arranged in NC4HW4 format. The rearrangement algorithm not only consumes additional time due to a large-scale adjustment of data, but also adds an additional channel filling step for a matrix of which a number of channels is not divisible by 4 during operation. For a large matrix, the improvement of the overall efficiency of matrix operation brought by the rearrangement algorithm offsets the additional cost brought by channel filling; and for a small matrix, the additional cost brought by channel filling has significant impact on the operation efficiency of the matrix.

In the scenario of calculating image data, how to improve the operation efficiency of the small matrix is a technical problem that needs to be resolved urgently.

SUMMARY

Embodiments of this disclosure provide a method and apparatus for operating image data, a device, and a storage medium. The technical solutions are as follows:

According to an aspect of this disclosure, a method for operating image data is provided, performed by a computer device, the method including:

reading matrix data from the image data based on a matrix size, M rows and N columns, of an image operator, M and N being positive integers;

calculating column data in the matrix data with a single calculation instruction corresponding to the image operator, to obtain an intermediate calculation result, the intermediate calculation result being in row form;

multiplexing and rearranging the intermediate calculation result into N rows of cached data;

calculating matrix elements of a target column in the N rows of cached data with the single calculation instruction, to obtain a calculation result of the matrix data under the single calculation instruction, the target column including N matrix elements in the intermediate calculation result; and outputting the calculation result as an image processing result of the matrix data by the image operator.

According to another aspect of this disclosure, an apparatus for operating image data is provided, including a memory operable to store computer-readable instructions and a processor circuitry operable to read the computer-readable instructions. When executing the computer-readable instructions, the processor circuitry is configured to:

read matrix data from the image data based on a matrix size, M rows and N columns, of an image operator, M and N being positive integers;

calculate column data in the matrix data with a single calculation instruction corresponding to the image operator, to obtain an intermediate calculation result, the intermediate calculation result being in row form;

multiplex and rearrange the intermediate calculation result into N rows of cached data;

calculate matrix elements of a target column in the N rows of cached data with the single calculation instruction, to obtain a calculation result of the matrix data under the single calculation instruction, the target column comprising N matrix elements in the intermediate calculation result; and output the calculation result as an image processing result of the matrix data by the image operator.

According to another aspect of this disclosure, a non-transitory machine-readable media storing instructions is provided. When being executed, the instructions is configured to cause a machine to:

read matrix data from the image data based on a matrix size, M rows and N columns, of an image operator, M and N being positive integers;

calculate column data in the matrix data with a single calculation instruction corresponding to the image operator, to obtain an intermediate calculation result, the intermediate calculation result being in row form;

multiplex and rearrange the intermediate calculation result into N rows of cached data;

calculate matrix elements of a target column in the N rows of cached data with the single calculation instruction, to obtain a calculation result of the matrix data under the single calculation instruction, the target column comprising N matrix elements in the intermediate calculation result; and output the calculation result as an image processing result of the matrix data by the image operator.

In the scenario of calculating image data, the intermediate calculation result of the matrix data is multiplexed and rearranged, and an operation is performed on the multiplexed and rearranged intermediate calculation results, to obtain an operation result of the matrix data. This method does not require channel filling during data rearrangement, so the resource consumption of channel filling is avoided, caused by the fact that the number of channels in the matrix cannot be divided by 4 in the related art rearrangement algorithm. Although non-target columns in the cached data in this solution consume some storage resources, for a matrix with a smaller number of channels, the non-target columns consume less, so that the operation efficiency of a small matrix can be significantly improved.

BRIEF DESCRIPTION OF THE DRAWINGS

FIG. 1 is a schematic diagram of a matrix of three rows and three columns according to an exemplary embodiment of this disclosure.

FIG. 2 is a schematic diagram of a coefficient matrix of three rows and three columns according to an exemplary embodiment of this disclosure.

FIG. 3 is a structural block diagram of a computer device according to an embodiment of this disclosure.

FIG. 4 is a schematic diagram of a matrix operation architecture for image data according to an embodiment of this disclosure.

FIG. 12 is a schematic diagram of a for operating image data according to an exemplary embodiment of this disclosure.

FIG. 13 is a schematic diagram of a special situation of a method for operating image data according to an exemplary embodiment of this disclosure.

FIG. 14 is a schematic diagram of a special situation of a method for operating image data according to an exemplary embodiment of this disclosure.

FIG. 15 is a schematic diagram of a method for operating image data according to an exemplary embodiment of this disclosure.

DESCRIPTION OF EMBODIMENTS

Figure 5:
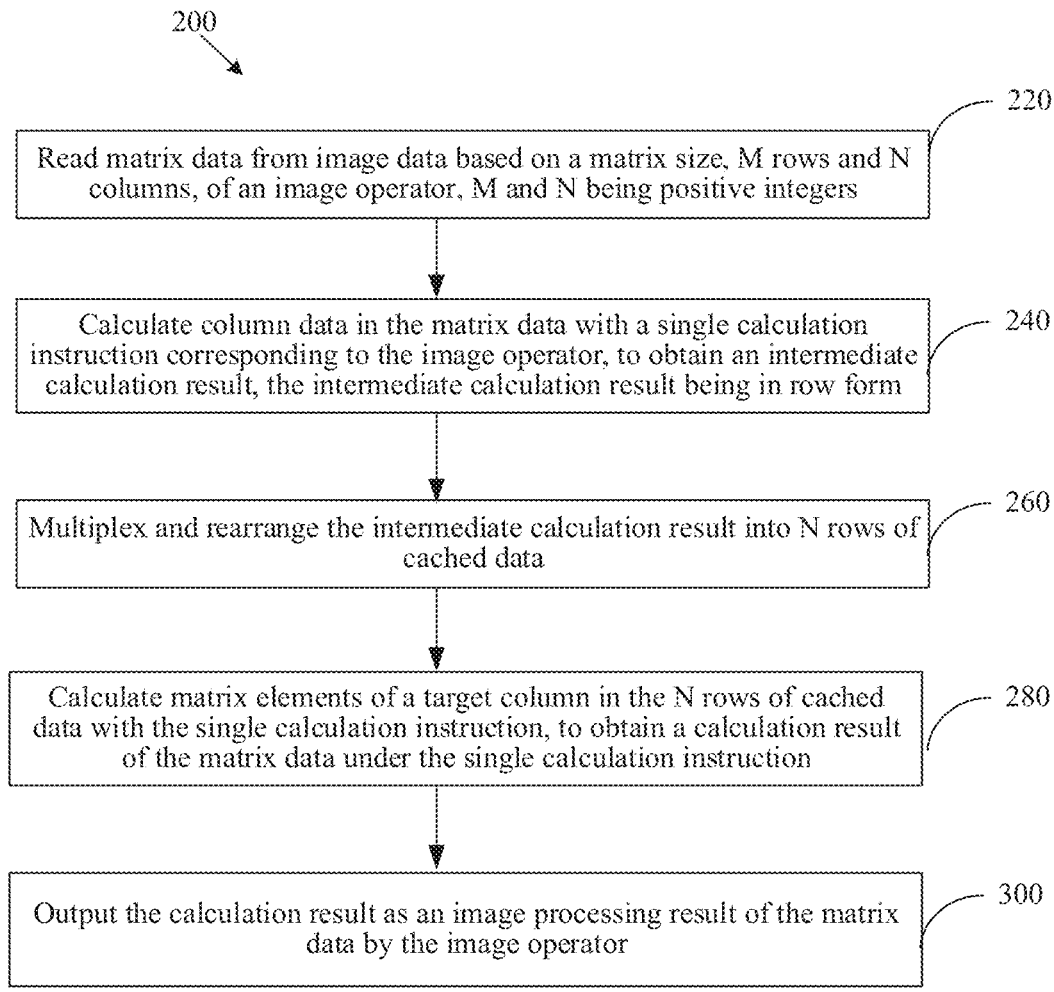
FIG. 5 is a flowchart of a method for operating image data according to an exemplary embodiment of this disclosure.

Image operator is used for matrix operation for image processing.

Matrix data is computer data stored in matrix form.

Matrix element refers to each piece of data that makes up a matrix. Matrix elements are stored in a memory of a computer device, and each matrix element has a corresponding storage address. The computer device may obtain the matrix element by accessing the storage address of the matrix element.

Single calculation instruction includes at least one of the following: a summation instruction, a maximum finding instruction, a minimum finding instruction, and a convolution instruction.

The summation instruction is used to instruct adding up elements in the matrix to obtain a summation result. Using a matrix of three rows and three columns in FIG. 1 as an example, a result outputted for the summation instruction is $R0=a0+a1+a2+b0+b1+b2+c0+c1+c2$.

A mean filter instruction is used to instruct performing a mean filter operation on elements in a matrix to obtain a result, that is, adding up the elements in the matrix and then, dividing the sum by the number of matrix elements. Using a matrix of three rows and three columns in FIG. 1 as an example, a result outputted for the mean filter instruction is $R0=(a0+a1+a2+b0+b1+b2+c0+c1+c2)/9$.

The maximum finding instruction is used to instruct comparing magnitudes of elements in a matrix to obtain a maximum. Using a matrix of three rows and three columns in FIG. 1 as an example, a result outputted for the maximum finding instruction is $R0=Max(a0, a1, a2, b0, b1, b2, c0, c1, c2)$.

The minimum finding instruction is used to instruct comparing magnitudes of elements in a matrix to obtain a minimum. Using a matrix of three rows and three columns in FIG. 1 as an example, a result outputted for the minimum finding instruction is $R0=Min(a0, a1, a2, b0, b1, b2, c0, c1, c2)$.

The convolution instruction is used to instruct multiplying elements in a matrix by coefficients at corresponding positions in a coefficient matrix respectively, adding up the results, and then dividing the sum by a number of the elements of the matrix, to obtain a multiplication result. Using a matrix of three rows and three columns in FIG. 1 as an example, in which the coefficient matrix is a matrix of three rows and three columns shown in FIG. 2, and a result outputted for the convolution instruction is $R0=(a0*k00+a1*k01+a2*k02+b0*k10+b1*k11+b2*k12+c0*k20+c1*k21+c2*k22)/9$.

Rearranging source data on a large scale using the matrix rearrangement algorithm in the related art consumes a lot of extra time. For a matrix of which a number of channels is not divisible by 4, channel filling needs to be performed in every operation, which consumes a lot. For an operation of a small matrix, the optimization and improvement effect is poor. In the method provided in this disclosure, only an intermediate calculation result of matrix data read from image data needs to be fine-tuned and rearranged. For a matrix with a smaller convolution kernel, the extra cost is less, so that the optimization effect for the small matrix is better.

FIG. 3 is a schematic structural diagram of a computer device according to an exemplary embodiment of this disclosure. The device includes: a bus 101, a processor 102, and a memory 103.

The processor 102 includes one or more processing cores, and the processor 102 performs various functional applications and information processing by running a software program and module.

The memory 103 is connected to the processor 102 by the bus 101.

The memory 103 may be configured to store at least one instruction, and the processor 102 is configured to execute the at least one instruction to implement steps in the following method embodiments.

In an exemplary implementation, the memory 103 further includes one or more registers 104. The register 104 can be configured to store data read using a single instruction multiple data (SIMD) instruction, and an intermediate calculation result of a matrix data operation, and data stored in a sliding window in sliding window processing.

In addition, the memory 103 may be implemented by any type of transitory or non-transitory storage device or a combination thereof. The transitory or non-transitory storage device includes, but is not limited to: a magnetic disk, an optical disc, an electrically-erasable programmable read-only memory (EEPROM), an erasable programmable read-only memory (EPROM), a static random access memory (SRAM), a read only memory (ROM), a magnetic memory, a flash memory, or a programmable read-only memory (PROM).

The computer device in the embodiments of this disclosure may be a smartphone, a tablet computer, a personal computer, a wearable device, an in-vehicle terminal, a server, or the like, which is not limited in the embodiments of this disclosure. In some embodiments, an application with needs, such as image processing, image recognition, and image segmentation, is installed on the computer device, and the application needs to perform a matrix operation on image data during operation.

FIG. 4 is a schematic diagram of a matrix operation architecture for image data according to an exemplary embodiment of this disclosure. The operation architecture includes: input data 30, an algorithm processing module 40, and output data 50.

The input data 30 is at least one input matrix of M rows and N columns read by the computer device from the image data, and the output data 50 is an image processing result obtained by the computer device through operation performed by the algorithm processing module 40. The algorithm processing module 40 may represent an entire algorithm including a plurality of functions or modules. Alternatively, the algorithm processing module 40 is only a single function or module.

FIG. 5 is a flowchart of a method 200 for operating image data according to an exemplary embodiment of this disclosure. Exemplarily, the operation method 200 for matrix data is performed by a computer device shown in FIG. 3. The method 200 includes:

Step 220: Read matrix data from the image data based on a matrix size, M rows and N columns, of an image operator, M and N being positive integers.

In an artificial intelligence (AI) application for image processing, a to-be-processed image is stored in a computer device in matrix form according to the size of a pixel. When the image is processed by an image operator (such as a convolution kernel) in a neural network, a value of each pixel in a region in which the image operator is located needs to be read.

Exemplarily, an image operator with a matrix size of three rows and three columns is used to analyze and process the to-be-processed image, and the matrix data of three rows and three columns are read from the image data, which are a0, a1, a2, b0, b1, b2, c0, c1, and c2 respectively. The obtained image operator is shown in a matrix 10 in FIG. 6.

Step 240: Calculate column data in the matrix data using a single calculation instruction corresponding to the image operator, to obtain an intermediate calculation result, the intermediate calculation result being in row form.

The single calculation instruction corresponding to the image operator is determined as one of the five single calculation instructions. According to the single calculation instruction, the column data in the matrix data of M rows and N columns is calculated respectively, to obtain an intermediate calculation result in row form. The method is as follows:

adding up matrix elements of each column in the matrix data in response to the single calculation instruction corresponding to the image operator being a summation instruction;

performing mean filter on matrix elements of each column in the matrix data in response to the single calculation instruction corresponding to the image operator being a mean filter instruction;

finding a maximum in matrix elements of each column in the matrix data in response to the single calculation instruction corresponding to the image operator being a maximum finding instruction;

finding a minimum in matrix elements of each column in the matrix data in response to the single calculation instruction corresponding to the image operator being a minimum finding instruction; or multiplying, in response to the single calculation instruction corresponding to the image operator being a convolution instruction, matrix elements of each column in the matrix data by corresponding coefficient values and adding up the products.

In some embodiments, the computer device calculates column data in each column of the matrix data according to the single calculation instruction to obtain a one-row intermediate calculation result.

Figure 6:
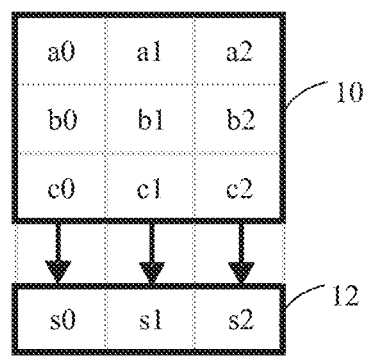
FIG. 6 is a schematic diagram of a method for operating image data according to an exemplary embodiment of this disclosure.

Exemplarily, in an image operator 10 of three rows and three columns shown in FIG. 6, matrix elements of each column in the matrix data are calculated as instructed by the single calculation instruction, to obtain a one-row intermediate calculation result 12.

Step 260: Multiplex and rearrange the intermediate calculation result into N rows of cached data.

The method for multiplexing and rearranging the intermediate calculation result into N rows of cached data may be moving the intermediate calculation result leftward i times and rightward N−1−i times respectively, to obtain N-row cached results, i being an integer less than or equal to N and greater than or equal to 0. That is, when the value of i is 0, the computer device moves the intermediate calculation result rightward N−1 times continuously, to obtain N rows of cached data; when the value of i N−1, the computer device moves the intermediate calculation result leftward N−1 times continuously, to obtain N rows of cached data; and when the value of i is an integer less than N−1 and greater than 0, the computer device needs to move the intermediate calculation result to leftward and rightward. The method for multiplexing and rearranging the intermediate calculation result is not limited in this disclosure.

In this embodiment, using an example in which the intermediate calculation result is s1, s2, and s3 in one row and three columns, the intermediate calculation result is multiplexed and rearranged.

Figure 7:
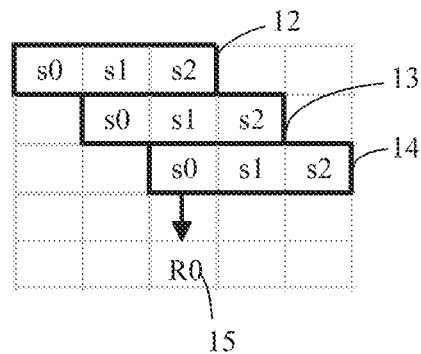
FIG. 7 is a schematic diagram of multiplexing and rearranging an intermediate calculation result according to an exemplary embodiment of this disclosure.

Exemplarily, as shown in FIG. 7, the intermediate calculation result 12 is moved rightward twice, to respectively obtain an intermediate calculation result 13 after one move and an intermediate calculation result 14 after two moves.

Figure 8:
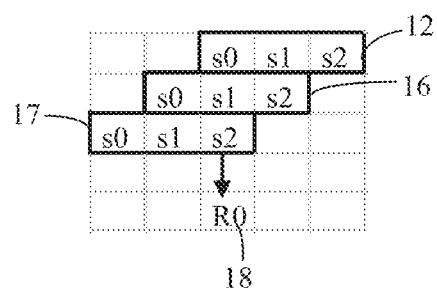
FIG. 8 is a schematic diagram of multiplexing and rearranging an intermediate calculation result according to an exemplary embodiment of this disclosure.

Exemplarily, as shown in FIG. 8, the intermediate calculation result 12 is moved leftward twice, to respectively obtain an intermediate calculation result 16 after one move and an intermediate calculation result 17 after two moves.

Figure 9:
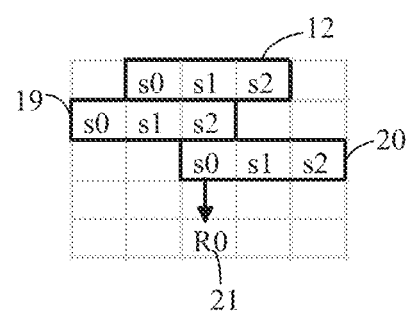
FIG. 9 is a schematic diagram of multiplexing and rearranging an intermediate calculation result according to an exemplary embodiment of this disclosure.

Exemplarily, as shown in FIG. 9, the intermediate calculation result is moved leftward once and rightward once respectively, to obtain an intermediate calculation result 19 after one leftward move and an intermediate calculation result 20 after one rightward move.

Step 280: Calculate matrix elements of a target column in the N rows of cached data using the single calculation instruction, to obtain a calculation result of the matrix data under the single calculation instruction.

The target column includes N matrix elements in the intermediate calculation result. That is, a column including all N matrix elements in the intermediate calculation result in the N rows of cached data is the target column. For example, in FIG. 7, FIG. 8, and FIG. 9, the target column refers to a column in which s0, s1, and s2 all exist.

The computer device calculates the matrix elements in the target column using the single calculation instruction, to obtain a calculation result of the matrix data under the single calculation instruction. For example, in FIG. 7, a calculation result 15 is obtained by calculating s2, s1, and s0. In FIG. 8, a calculation result 18 is obtained by calculating s0, s1, and s2; and in FIG. 9, a calculation result 21 is obtained by calculating s2, s1, and s0. The method for calculating matrix elements of a target column in the N rows of cached data using the single calculation instruction, to obtain a calculation result of the matrix data under the single calculation instruction, is as follows:

adding up, in response to the single calculation instruction corresponding to the image operator being a summation instruction, the matrix elements in the target column, to obtain a calculation result;

adding up, in response to the single calculation instruction corresponding to the image operator being a mean filter instruction, the matrix elements in the target column and dividing the sum by a number of the matrix elements, to obtain a calculation result;

finding, in response to the single calculation instruction corresponding to the image operator being a maximum finding instruction, a maximum in the matrix elements in the target column, to obtain a calculation result;

finding, in response to the single calculation instruction corresponding to the image operator being a minimum finding instruction, a minimum in the matrix elements in the target column, to obtain a calculation result; or adding up, in response to the single calculation instruction corresponding to the image operator being a convolution instruction, the matrix elements in the target column and dividing the sum by a number of the matrix elements, to obtain a calculation result.

Step 300: Output the calculation result as an image processing result of the matrix data by the image operator.

Exemplarily, an example in which the image operator of three rows and three columns is used to process the image data is used as an example.

Based on the matrix size, three rows and three columns, of the image operator, the matrix data is read from the to-be-processed image, as indicated by a matrix 10 in FIG. 6.

When the matrix operation instruction is a summation instruction, a summation operation is performed on each column of matrix data, to obtain an intermediate calculation result: s0=a0+b0+c0, s1=a1+b1+c1, and s2=a2+b2+c2. The intermediate calculation result is multiplexed and rearranged in any multiplexing and rearranging manner described in step 220, to obtain N rows of cached data, a target column in which all of s0, s1, and s2 are located is determined, and summation is performed the target column data, to obtain an operation result of the matrix data, that is, R0=s0+s1+s2, which is outputted as an image processing result of the matrix data obtained by the image operator.

When the matrix operation instruction is a mean filter instruction, a summation operation is performed on each column of matrix data, to obtain an intermediate calculation result: s0=a0+b0+c0, s1=a1+b1+c1, and s2=a2+b2+c2. The intermediate calculation result is multiplexed and rearranged in any multiplexing and rearranging manner described in step 220, to obtain N rows of cached data, a target column in which all of s0, s1, and s2 are located is determined, summation is performed on the target column data, and then, the sum is divided by a number of the matrix elements, to obtain an operation result of the matrix data, that is, R0= (s0+s1+s2)/9, which is outputted as an image processing result of the matrix data obtained by the image operator.

When the matrix operation instruction is a maximum finding instruction, a maximum finding operation is performed on each column of matrix data, to obtain an intermediate calculation result: s0=max(a0, b0, c0), s1=max(a1, b1, c1), and s2=max(a2, b2, c2). The intermediate calculation result is multiplexed and rearranged in any multiplexing and rearranging manner described in step 220, to obtain N rows of cached data, a target column in which all of s0, s1, and s2 are located is determined, and a maximum finding operation is performed on the target column data, to obtain an operation result of the matrix data, that is, R0=max(s0, s1, s2), which is outputted as an image processing result of the matrix data obtained by the image operator.

When the matrix operation instruction is a minimum finding instruction, a minimum finding operation is performed on each column of matrix data, to obtain an intermediate calculation result: s0=min(a0, b0, c0), s1=min(a1, b1, c1), and s2=min(a2, b2, c2). The intermediate calculation result is multiplexed and rearranged in any multiplexing and rearranging manner described in step 220, to obtain N rows of cached data, a target column in which s0, s1, and s2 are located is determined, and a minimum finding operation is performed on the target column data, to obtain an operation result of the matrix data, that is, R0=min(s0, s1, s2), which is outputted as an image processing result of the matrix data obtained by the image operator.

When the matrix operation instruction is a convolution instruction, a convolution operation is performed on each column of matrix data, to obtain an intermediate calculation result: s0=a0*k00+b0*k10+c0*k20, s1=a1*k01+b1*k11+c1*k21, s2=a2*k02+b2*k12+c2*k22. The intermediate calculation result is multiplexed and rearranged in any multiplexing and rearranging manner described in step 220, to obtain N rows of cached data, a target column in which all of s0, s1, and s2 are located is determined, summation is performed on the target column data, and then, the sum is divided by a number of the matrix elements, to obtain an operation result of the matrix data, that is, R0=(s0+s1+s2)/9, which is outputted as an image processing result of the matrix data obtained by the image operator.

In conclusion, in this embodiment, matrix data is read from image data, matrix elements of each column in the matrix data are calculated respectively, then, an obtained intermediate calculation result is multiplexed and rearranged, and the multiplexed and rearranged data is calculated, to obtain a calculation result of the matrix data under the single calculation instruction. This embodiment reduces repeated calculations of data of a single element in the matrix, improves the concurrency of matrix operations, and further improves the matrix operation efficiency of the image data.

Figure 10:
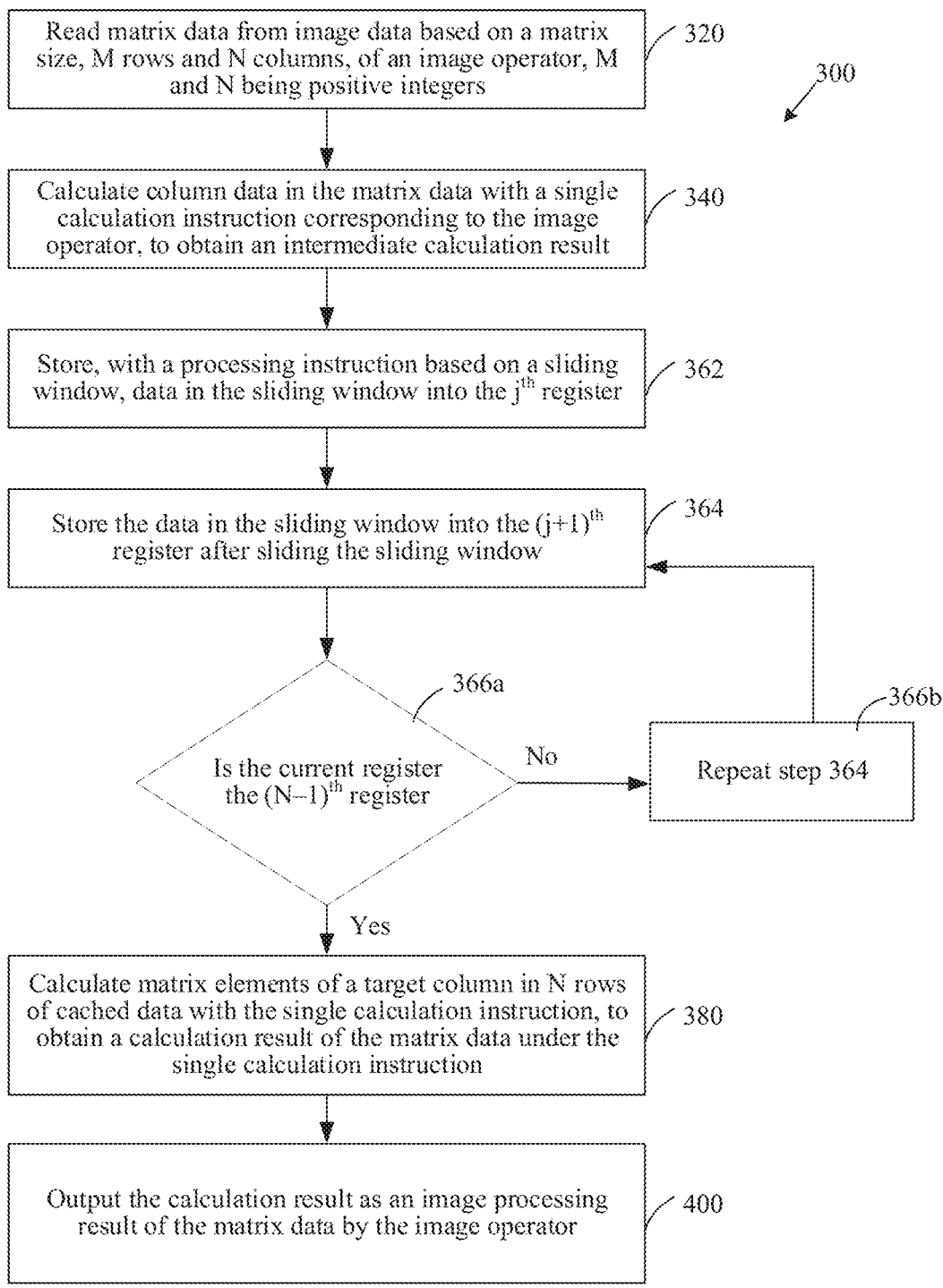
FIG. 10 is a flowchart of a method for operating image data according to an exemplary embodiment of this disclosure.

FIG. 10 is a flowchart of a method 300 for operating image data according to an exemplary embodiment of this disclosure. A neon instruction applicable to an arm processor is as an example in this embodiment. For a single instruction multiple data (SIMD) instruction for loading/storing data of the uint8_t type, 16 pieces uint8_t data are read/written at a time. Exemplarily, the method 300 for operating image data is performed by a computer device shown in FIG. 3. The method 300 includes:

Step 320: Read matrix data from the image data based on a matrix size, M rows and N columns, of an image operator, M and N being positive integers.

For an implementation of this step, reference may be made to step 220.

In this embodiment, an example in which the image operator for operation is a matrix of three rows and three columns is used.

Figure 11:
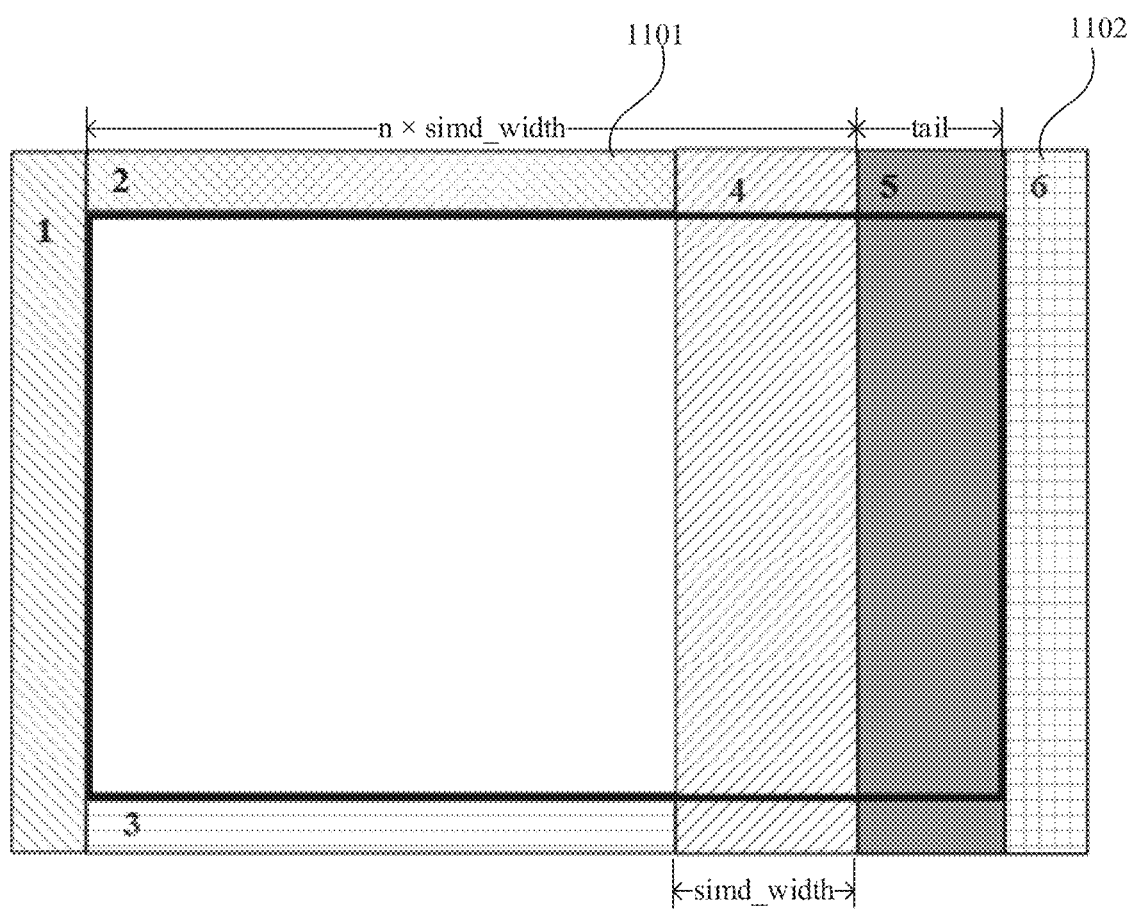
FIG. 11 is a schematic example diagram of a method for operating image data according to an exemplary embodiment of this disclosure.

Exemplarily, the bold solid-line box in FIG. 11 represents an original image 1101, and a region outside the solid-line box is a boundary-expanded region 1102 that is expanded to accommodate the matrix operation overflowing an effective region of the image. A width of the original image 1101 is n×simd_width+tail, simd_width is an amount of data read and written by an SIMD instruction at a time, tail is less than simd_width, and n is a positive integer.

The operation is started from the upper left corner of the original image 1101 represented by the bold solid-line box in FIG. 11, a pixel in the original image 1101 is selected as a center point of a matrix of three rows and three columns, and matrix data of three rows and three columns is read.

Figure 12:
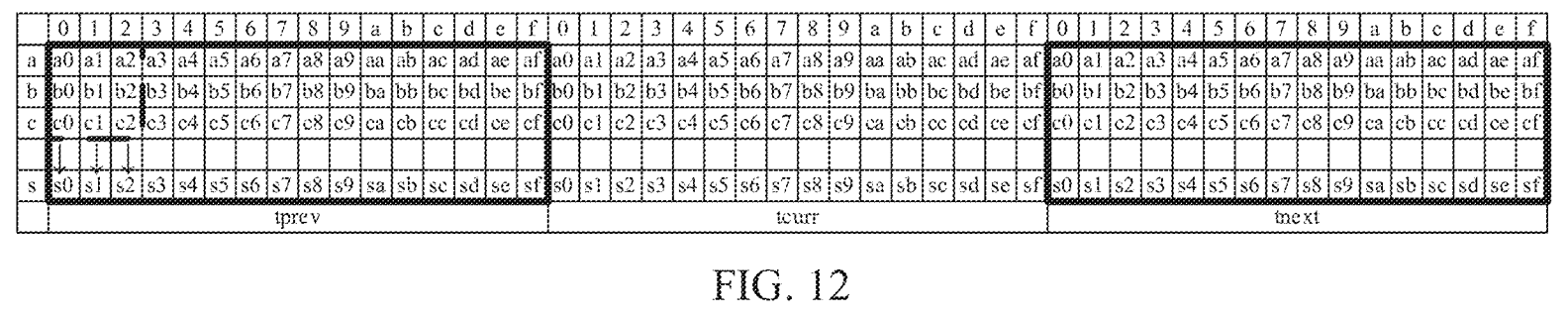

Exemplarily, the neon instruction is used to read 16 pieces of data in the original image at a time, and a matrix of three rows and three columns is obtained from the read data. For example, a dashed-line box in FIG. 12 represents a matrix of three rows and three columns. Matrix elements in the matrix are a0, a1, a2, b0, b1, b2, c0, c1, and c2 respectively.

Step 340: Calculate column data in the matrix data using a single calculation instruction corresponding to the image operator, to obtain an intermediate calculation result.

For an implementation of this step, reference may be made to step 240.

Same operations are performed on the remaining columns in the register, to obtain a rows representing an intermediate calculation result in FIG. 12.

Step 362: Store, by using a processing instruction based on a sliding window, data in the sliding window into the $j^{th}$ register, a starting value of j being 0.

In this embodiment, using an example in which the SIMD instruction reads/writes 16 pieces of data at a time, a window size is 16.

To meet requirements of a matrix operation instruction through the intermediate calculation result, the intermediate calculation result needs to be rearranged and multiplexed. Columns of data in an intermediate calculation result obtained through a matrix of M rows and N columns are arranged into the same column using a sliding window processing method, and then, a final matrix calculation result is obtained through a single calculation instruction. A starting step of sliding window processing is to first determine a starting position of a window and put window data into a register t0.

Exemplarily, a sliding window with a window size of 16 is selected, and a starting position of the sliding window is located at a starting point of the intermediate calculation result of one row and N columns. The data in the sliding window is stored into the initial register t0.

Step 364: Store the data in the sliding window into the $(j+1)^{th}$ register after sliding the sliding window.

The sliding window processing method is used to arrange columns of data in the intermediate calculation result obtained through the matrix of M rows and N columns into the same column, so that the objective of the matrix operation instruction is achieved. The sliding window needs to be moved at least N−1 times in the sliding window processing method.

Exemplarily, the sliding method may be continuously sliding the sliding window leftward N−1 times from the starting point of the intermediate calculation result of one row and N columns; or continuously sliding the sliding window rightward N−1 times from the starting point of the intermediate calculation result of one row and N columns; or continuously sliding the sliding window leftward i times from the starting point of the intermediate calculation result of one row and N columns, and continuously sliding the sliding window rightward N−1−i times from the starting point of the intermediate calculation result of one row and N columns, i being an integer greater than or equal to 0 and less than or equal to N−1.

After the sliding window is slid, the K pieces of data in the sliding window are stored into the $(j+1)^{th}$ register, and the value of j is updated to j=j+1, a starting value of j being 0.

The process of sliding the sliding window may involve problems beyond the scope of matrix operations, and a computer device may expand the boundary of the matrix; or the matrix is calculated by using the scalar method; or the operation is skipped.

Using FIG. 11 as an example, the bold solid-line box in FIG. 11 represents an original image 1101, and a region outside the bold solid-line box is a boundary-expanded region 1102 that is expanded to accommodate the matrix operation overflowing an effective region of the image. A starting position of the operation is located at the upper left corner of the bold solid-line box. Using an example in which an operation is performed on a matrix of three rows and three columns by using sliding window processing method, the size of the image is much greater than 3*3. A register tcurr is configured to store a value of a region that currently needs to be operated on, a register tprev is configured to store a value of an adjacent region on the left of the region that currently needs to be operated on, and a register tnext is configured to store a value of an adjacent region on the right of the region that currently needs to be operated on. In the original image 1101 represented by the bold solid-line box in FIG. 11, the data is read through the SIMD instruction and put into the register tcurr, and the successive pieces of data are obtained forward and backward respectively and put into the register tprev and the register tnext respectively.

Exemplarily, when a starting point of the register tcurr is located in the first column of original image 1101, the calculation involving the column in which data in the register tprev is located is skipped. Since there is no content on the left side of the original image 1101, that is, the register tprev relates to a region 1 represented by diagonally downward stripes in FIG. 11, the register tprev is empty, a result cannot be calculated, and the operation of the column is skipped. That is, when a column position x of a center point of the calculated matrix is less than or equal to half of a number of columns of the matrix, since the register tprev is empty, a result cannot be obtained, and the operation of the column is skipped. For example, the bold solid-line box in the row of a register t1 in FIG. 13 represents the last bit of data sf in the register tprev. When the starting point of the register tcurr is located in the first column, the register tprev is empty, and a calculation result cannot be obtained, that is, the operation of the first column is skipped.

Exemplarily, when a starting point of the register tcurr is located in the first row or the last row of the original image 1101, the boundary of the matrix is expanded. That is, when a row position y of the center point of the calculated matrix is less than or equal to half of a number of rows of the matrix, or when y is greater than or equal to an image height minus half of the number of rows of the matrix, the matrix operation relates to a region 2 represented by the diagonal square stripes above the image in FIG. 11 and a region 3 represented by horizontal stripes below the image. In this case, the boundary of the matrix is expanded. The method of expanding the boundary may be defined in advance, for example, the boundary-expanded region within the boundary is always 0; or the boundary-expanded region within the boundary region is always 1; or a value of the expanded edge region is the same as the size of the pixel in the adjacent matrix. The method for boundary expansion and filling is not limited in this disclosure.

Exemplarily, when the starting point of the register tcurr is located in a region 4 and does not relate to a boundary-expanded region 6, the operation of the matrix is not affected. Since a width of the region 4 is the same as a number of pieces of data in a read/write operation performed through the SIMD instruction, the register tnext relates to a value of a region 5 filled and represented by gray on the right side of FIG. 11 and/or a value of the region 6 filled and represented by squares. Since the image itself has a boundary-expanded region, the operation may be performed. For example, the bold solid-line box in the row of the register t2 in FIG. 13 represents the first-bit data s0 in the register tnext. The intermediate calculation result s0 is calculated from data a0, b0, and c0 in the register tnext, and a0, b0, and c0 fall within the range of the boundary-expanded region, so the operation of the matrix is not affected.

Figure 14:
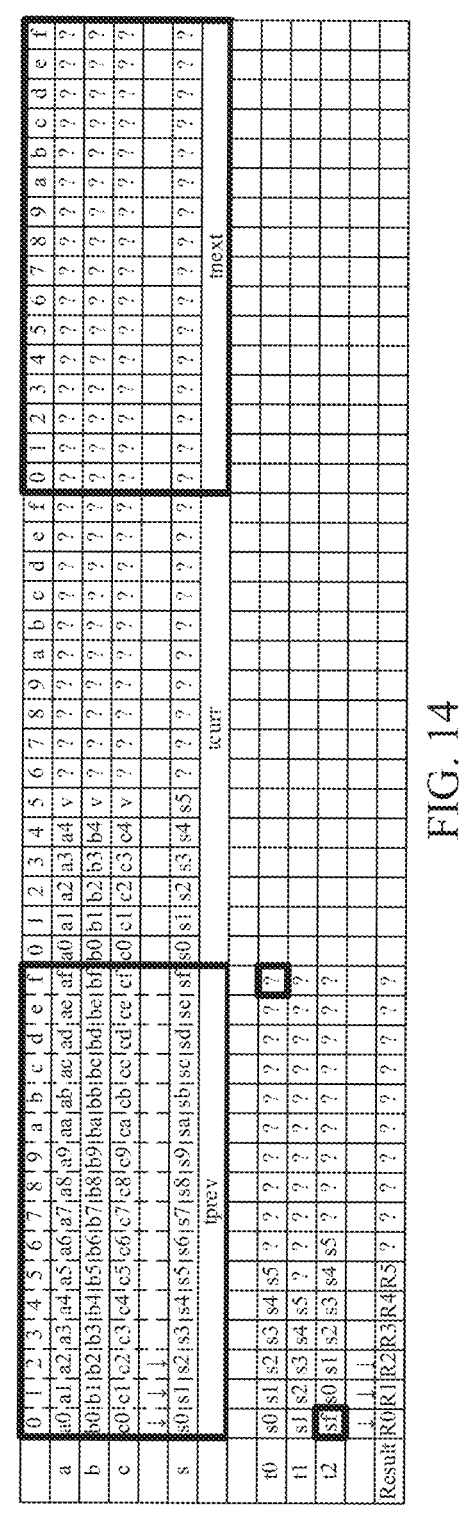

Exemplarily, when the starting point of the register tcurr is located in a region 4 and relates to a boundary-expanded region 6, or the starting point of the register tcurr is located in a region 5 filled and represented by gray, the operation result of the matrix is obtained through the scalar method, that is, an operation is directly performed on the source data. In this case, the starting point of the register tnext is located at an unknown address outside the expanded boundary of the image. As shown in FIG. 14, the first four columns in the register tcurr are data in the image, and the fifth column is filled data of the boundary-expanded region. An intermediate calculation result, s1 to s5, is obtained. The sliding window processing method is used for the intermediate calculation result. In this case, only R1 to R4 can be obtained, and a result R5 cannot be obtained. The scalar method is required for R5, that is, comparison is directly performed on the size of the source data in the matrix.

Exemplarily, when a width of the image is an integer multiple of the number of pieces of data in a read/write operation performed through the SIMD instruction, that is, there is no a tail region 5 in FIG. 11, the last number in tcurr is calculated through the scalar method, that is, comparison is directly performed on the size of the source data in the matrix.

Step 366a: Determine whether the current register is the $(N-1)^{th}$ register.

In an exemplary implementation, when j does not reach N, after sliding the sliding window, the computer device stores the data in the sliding window into a $(j+1)^{th}$ register until N rows of cached data stored in N registers are obtained.

The computer device determines whether the current register is the $(N-1)^{th}$ register. When the current register is the $(N-1)^{th}$ register, the computer device completes the sliding window processing process, and performs step 380. When the current register is not the $(N-1)^{th}$ register, the computer device further needs to repeat step 364 to continuously slide the window for value caching.

Step 366b: Repeat step 364 until the N rows of cached data stored in the N registers are obtained.

In the obtained N rows of cached data, a column in which all of N matrix elements of the intermediate calculation result exist is a target column for subsequent operations.

Step 380: Calculate matrix elements of a target column in the N rows of cached data using the single calculation instruction, to obtain a calculation result of the matrix data under the single calculation instruction.

The target column is a column in which N matrix elements in the intermediate calculation result are located in the N rows of cached data.

The method for calculating matrix elements of a target column in the N rows of cached data using the single calculation instruction, to obtain a calculation result of the matrix data under the single calculation instruction, is as follows:

adding up, in response to the single calculation instruction corresponding to the image operator being a summation instruction, the matrix elements in the target column, to obtain a calculation result adding up, in response to the single calculation instruction corresponding to the image operator being a mean filter instruction, the matrix elements in the target column and dividing the sum by a number of the matrix elements, to obtain a calculation result;

finding, in response to the single calculation instruction corresponding to the image operator being a maximum finding instruction, a maximum in the matrix elements in the target column, to obtain a calculation result;

finding, in response to the single calculation instruction corresponding to the image operator being a minimum finding instruction, a minimum in the matrix elements in the target column, to obtain a calculation result; or adding up, in response to the single calculation instruction corresponding to the image operator being a convolution instruction, the matrix elements in the target column and dividing the sum by a number of the matrix elements, to obtain a calculation result.

Step 400: Output the calculation result as an image processing result of the matrix data by the image operator.

Figure 15:
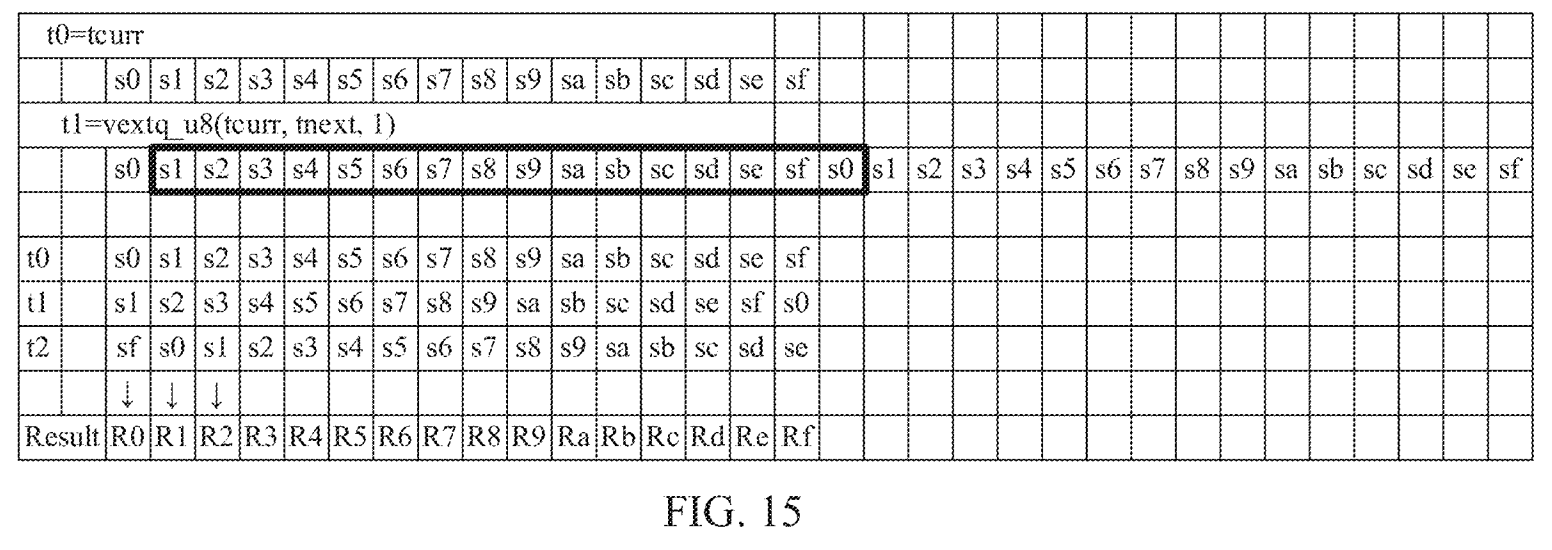

Exemplarily, as shown in FIG. 15, an example in which a maximum of a matrix of three rows and three columns is found through a sliding window processing method is used. A sliding window of a size of a 16 is selected, and a starting point of an initial position is located at a starting point of a register tcurr in a row s. Data in the initial sliding window is stored into a register to. That is, in FIG. 15, 16 pieces of data in the register tcurr are stored into the register t0. The sliding window is slid rightward by one bit from the initial position, and the position of the window after the sliding is indicated by the bold solid-line box in FIG. 15. Data in the sliding window is stored into a register t1. That is, the last 15 bits of data in the register tcurr and the first bit of data in the register tnext are stored into the register t1. When it is determined that the current register t1 is not the $(N-1)^{th}$ register (that is, a register t2), the sliding window operation is continuously performed. The sliding window is slid leftward by one bit from the initial position, and data in the sliding window is stored into the register t2. That is, the last bit of data in the register tprev and the first 15 bits of data in the register tcurr are stored into the register t2. When it is determined that the current register t2 is the $(N-1)^{th}$ register, a target column is determined, and a single calculation instruction is used to calculate matrix elements of the target column in cached data. A maximum of the target column in registers t0, t1 and t2 is found. That is, a maximum finding instruction can be implemented on the matrix of three rows and three columns. For example, a result obtained by finding the maximum of columns s0, s1, and s2 is the maximum of the matrix represented by the dashed-line box in FIG. 12.

Exemplarily, a process of performing a matrix operation by an image operator of three rows and three columns shown in this embodiment may further be analogized to small image operators of 5 rows and 5 columns, 7 rows and 7 columns, and the like. As shown in the foregoing embodiment, when a convolution kernel matrix is a matrix of three rows and three columns, an intermediate calculation result is multiplexed and rearranged into three rows of cached data through a sliding window, and storage resources of at most two non-target columns are consumed. When the convolution kernel matrix is a matrix of five rows and five columns, the intermediate calculation result is multiplexed and rearranged into five rows of cached data through the sliding window, and storage resources of at most four non-target columns are consumed. By analogy, when the convolution kernel matrix is a matrix of seven rows and seven columns, the intermediate calculation result is multiplexed and rearranged into seven rows of cached data through the sliding window, and storage resources of at most six non-target columns are consumed. It can be seen that, for a matrix with a smaller number of channels, less storage resources are consumed for the non-target columns. Therefore, this method may significantly improve the operation efficiency of small image operators.

In conclusion, in this embodiment, each column of data in matrix data is calculated respectively, then sliding window processing is performed on the obtained intermediate calculation result, and the data after being multiplexed and rearranged through the sliding window processing is calculated, to obtain a calculation result of the matrix data. In this embodiment, the obtained intermediate calculation result is multiplexed through a sliding window processing method, and data calculation results of a plurality of matrices are obtained at a time with reference to the SIMD instruction, which reduces repeated calculations of data of a single element in the matrix, improves the concurrency of matrix operations, and further improves the matrix operation efficiency of the image data.

Figures 16, 17:
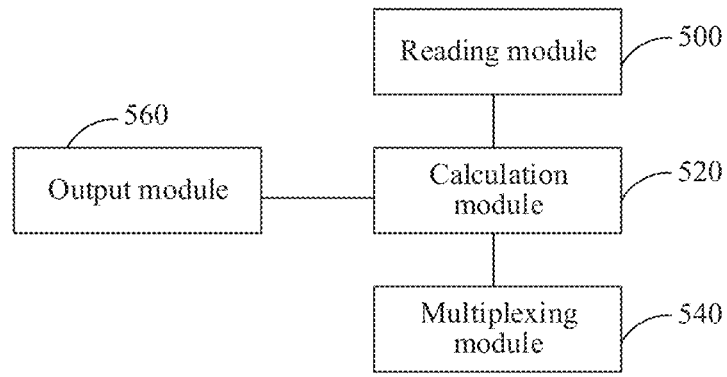
FIG. 16 is a diagram of optimization effect comparison between matrix operation methods for image data according to an exemplary embodiment of this disclosure.
FIG. 17 is a structural block diagram of an apparatus for operating image data according to an exemplary embodiment of this disclosure.

FIG. 16 shows time consumption comparison between performing a matrix operation for image data using this method and performing a matrix operation for image data by using a conventional method. For data of the Uint8_t type, an image operator of a size of 3×3 is selected to perform a matrix operation on image data. For resolutions of different sizes, upon comparison between use of this method and use of the OpenCV method, an obtained speedup ratio ranges from about 1.8 to 2.1. The speedup ratio refers to a ratio of a time consumed for a matrix operation using the conventional OpenCV method to a time consumed for a matrix operation using this method. It can be seen that this method greatly improves the matrix operation efficiency of the image data.

The following is an apparatus embodiment of this disclosure, which can be used to perform the method embodiments of this disclosure. For details not disclosed in the apparatus embodiments of this disclosure, reference may be made to the method embodiments of this disclosure.

FIG. 17 is a structural block diagram of an apparatus for operating image data according to an exemplary embodiment of this disclosure. The apparatus includes:

a reading module 500, configured to read matrix data from the image data based on a matrix size, M rows and N columns, of an image operator, M and N being positive integers;

a calculation module 520, configured to calculate column data in the matrix data using a single calculation instruction corresponding to the image operator, to obtain an intermediate calculation result, the intermediate calculation result being in row form;

a multiplexing module 540, configured to multiplex and rearrange the intermediate calculation result into N rows of cached data, the calculation module 520 being further configured to calculate matrix elements of a target column in the N rows of cached data using the single calculation instruction, to obtain a calculation result of the matrix data under the single calculation instruction, the target column including N matrix elements in the intermediate calculation result; and an output module 560, configured to output the calculation result as an image processing result of the matrix data by the image operator.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In an implementation, the multiplexing module 540 is configured to store, by using a processing instruction based on a sliding window, data in the sliding window into the $j^{th}$ register, the data in the sliding window including a part or all of the intermediate calculation result, a starting value of j being 0; and store, when j does not reach N, the data in the sliding window to the $(j+1)^{th}$ register after sliding the sliding window until N rows of cached data stored in N registers are obtained, the data in the sliding window including a part or all of the intermediate calculation result.

In an implementation, the processing instruction is a single instruction multiple data instruction, and the processing instruction supports simultaneous processing of K pieces of data.

The multiplexing module 540 is configured to store K pieces of data in the sliding window to the $j^{th}$ registers by using the processing instruction based on the sliding window, the data in the sliding window including a part or all of the intermediate calculation result; and store the K pieces of data in the sliding window into the $(j+1)^{th}$ register after sliding the sliding window.

In an implementation, the multiplexing module 540 is configured to store the K pieces of data in the sliding window into the $(j+1)^{th}$ register after sliding the sliding window leftward by one bit; or the multiplexing module 540 is configured to, store the K pieces of data in the sliding window into the $(j+1)^{th}$ register after sliding the sliding window rightward by one bit.

In an implementation, at least one of the following conditions exists in the N rows of cached data: a matrix element in the $j^{th}$ row and the $i^{th}$ column that is the same as a matrix element in the $(j+1)^{th}$ row and the $(i-1)^{th}$ column exists; or a matrix element in the $t^{th}$ row and the $i^{th}$ column that is the same as a matrix element in the $(t-1)^{th}$ row and the $(i+1)^{th}$ column exists.

In an implementation, the single calculation instruction is a mean filter instruction or a convolution instruction, and the calculation module 520 is configured to add up the N matrix elements of the target column in the cached data, to obtain a matrix element sum; and divide the matrix element sum by a number of the matrix elements, to output the calculation result of the matrix data under the single calculation instruction, the number of the matrix elements being equal to M times N.

In an exemplary embodiment, a computer-readable storage medium is further provided, the computer-readable storage medium storing at least one instruction, at least one program, a code set or an instruction set, and the at least one instruction, the at least one program, the code set or the instruction set being loaded and executed by the processor to implement the method for operating image data in the foregoing method embodiments.

In an exemplary embodiment, a computer program product or a computer program is provided, including a computer instruction, the computer instruction being stored in a computer-readable storage medium, a processor of a computer device reading the computer instruction from the computer-readable storage medium, and the processor executing the computer instruction, to cause the computer device to implement the method for operating image data in the foregoing aspects.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

What is claimed is:

1. A method for operating image data, performed by a computer device, the method comprising:
reading matrix data from the image data stored in the computer device based on a matrix size, M rows and N columns, of an image operator, M and N being positive integers, wherein the image operator comprises a convolution kernel in a neural network, and matrix elements in the matrix data is corresponding to pixels of an image represented by the image data;
calculating column data in the matrix data with a single calculation instruction corresponding to the image operator, to obtain an intermediate calculation result, the intermediate calculation result being in row form;
fine-tuning only the intermediate calculation result by multiplexing and rearranging the intermediate calculation result into N rows of cached data, the multiplexing and rearranging comprising:
storing, with a processing instruction based on a sliding window, data in the sliding window into a jth register, the data in the sliding window comprising at least a part of the intermediate calculation result, a starting value of j being 0; and
storing the data in the sliding window to the (j+1)th register after sliding the sliding window until N rows of cached data being stored in N registers;
calculating matrix elements of a target column in the N rows of cached data with the single calculation instruction, to obtain a calculation result of the matrix data under the single calculation instruction, the target column comprising N matrix elements in the intermediate calculation result; and
outputting the calculation result as an image processing result of the matrix data by the image operator.

2. The method according to claim 1, wherein the processing instruction is a single instruction multiple data instruction, and the processing instruction supports simultaneous processing of K pieces of data;
the storing the data in the sliding window into the $j^{th}$ register comprises:
storing K pieces of data in the sliding window to the $j^{th}$ register with the processing instruction based on the sliding window; and
the storing the data in the sliding window to a $(j+1)^{th}$ register after sliding the sliding window comprises:
storing the K pieces of data in the sliding window into the $(j+1)^{th}$ register after sliding the sliding window.

3. The method according to claim 2, wherein the storing the K pieces of data in the sliding window into the $(j+1)^{th}$ register after sliding the sliding window comprises:
storing the K pieces of data in the sliding window into the $(j+1)^{th}$ register after sliding the sliding window leftward by one bit.

4. The method according to claim 2, wherein the storing the K pieces of data in the sliding window into the $(j+1)^{th}$ register after sliding the sliding window comprises:
storing the K pieces of data in the sliding window into the $(j+1)^{th}$ register after sliding the sliding window rightward by one bit.

5. The method according to claim 1, wherein a matrix element in a $j^{th}$ row and a $i^{th}$ column is identical with a matrix element in a $(j+1)^{th}$ row and a $(i-1)^{th}$ column in the N rows of cached data.

6. The method according to claim 1, wherein a matrix element in a $t^{th}$ row and a $i^{th}$ column is identical with a matrix element in a $(t-1)^{th}$ row and a $(i+1)^{th}$ column in the N rows of cached data.

7. The method according to claim 1, wherein the single calculation instruction comprises at least one of:
a summation instruction,
a mean filter instruction,
a maximum finding instruction,
a minimum finding instruction, or
a convolution instruction.

8. The method according to claim 1, wherein the single calculation instruction is a mean filter instruction or a convolution instruction, and the calculating the matrix elements of the target column in the N rows of cached data to obtain the calculation result of the matrix data under the single calculation instruction comprises:
adding up the N matrix elements of the target column in the cached data, to obtain a matrix element sum; and
dividing the matrix element sum by a number of the matrix elements, to output the calculation result of the matrix data under the single calculation instruction, the number of the matrix elements being equal to M times N.

9. An apparatus for operating image data, comprising:
a memory operable to store computer-readable instructions; and
a processor circuitry operable to read the computer-readable instructions, the processor circuitry when executing the computer-readable instructions is configured to:
read matrix data from the image data stored in the memory based on a matrix size, M rows and N columns, of an image operator, M and N being positive integers, wherein the image operator comprises a convolution kernel in a neural network, and matrix elements in the matrix data is corresponding to pixels of an image represented by the image data;

calculate column data in the matrix data with a single calculation instruction corresponding to the image operator, to obtain an intermediate calculation result, the intermediate calculation result being in row form;

fine-tune only the intermediate calculation result by multiplexing and rearranging the intermediate calculation result into N rows of cached data, which comprises:

storing, with a processing instruction based on a sliding window, data in the sliding window into a $j^{th}$ register, the data in the sliding window comprising at least a part of the intermediate calculation result, a starting value of j being 0, and storing the data in the sliding window to the $(j+1)^{th}$ register after sliding the sliding window until N rows of cached data being stored in N registers;

calculate matrix elements of a target column in the N rows of cached data with the single calculation instruction, to obtain a calculation result of the matrix data under the single calculation instruction, the target column comprising N matrix elements in the intermediate calculation result; and output the calculation result as an image processing result of the matrix data by the image operator.

10. The apparatus according to claim 9, wherein the processing instruction is a single instruction multiple data instruction, and the processing instruction supports simultaneous processing of K pieces of data, the processor circuitry is configured to:

store K pieces of data in the sliding window to the $j^{th}$ register with the processing instruction based on the sliding window; and store the K pieces of data in the sliding window into the $(j+1)^{th}$ register after sliding the sliding window.

11. The apparatus according to claim 10, wherein the processor circuitry is configured to:

store the K pieces of data in the sliding window into the $(j+1)^{th}$ register after sliding the sliding window leftward by one bit.

12. The apparatus according to claim 10, wherein the processor circuitry is configured to:

store the K pieces of data in the sliding window into the $(j+1)^{th}$ register after sliding the sliding window rightward by one bit.

13. The apparatus according to claim 9, wherein a matrix element in a $j^{th}$ row and a $i^{th}$ column is identical with a matrix element in a $(j+1)^{th}$ row and a $(i-1)^{th}$ column in the N rows of cached data.

14. The apparatus according to claim 9, wherein a matrix element in a $t^{th}$ row and a $i^{th}$ column is identical with a matrix element in a $(t-1)^{th}$ row and a $(i+1)^{th}$ column in the N rows of cached data.

15. The apparatus according to claim 9, wherein the single calculation instruction comprises at least one of:

a summation instruction, a mean filter instruction, a maximum finding instruction, a minimum finding instruction, or a convolution instruction.

16. The apparatus according to claim 9, wherein the single calculation instruction is a mean filter instruction or a convolution instruction, and the processor circuitry is configured to:

add up the N matrix elements of the target column in the cached data, to obtain a matrix element sum; and divide the matrix element sum by a number of the matrix elements, to output the calculation result of the matrix data under the single calculation instruction, the number of the matrix elements being equal to M times N.

17. A non-transitory machine-readable media, having instructions stored on the machine-readable media, the instructions configured to, when executed, cause a machine to:

read matrix data from image data based on a matrix size, M rows and N columns, of an image operator, M and N being positive integers, wherein the image operator comprises a convolution kernel in a neural network, and matrix elements in the matrix data is corresponding to pixels of an image represented by the image data;

calculate column data in the matrix data with a single calculation instruction corresponding to the image operator, to obtain an intermediate calculation result, the intermediate calculation result being in row form;

fine-tune only the intermediate calculation result by multiplexing and rearranging the intermediate calculation result into N rows of cached data, which comprises:

storing, with a processing instruction based on a sliding window, data in the sliding window into a $j^{th}$ register, the data in the sliding window comprising at least a part of the intermediate calculation result, a starting value of j being 0, and storing the data in the sliding window to the $(j+1)^{th}$ register after sliding the sliding window until N rows of cached data being stored in N registers;

calculate matrix elements of a target column in the N rows of cached data with the single calculation instruction, to obtain a calculation result of the matrix data under the single calculation instruction, the target column comprising N matrix elements in the intermediate calculation result; and output the calculation result as an image processing result of the matrix data by the image operator.

* * * * *